United States Patent
Borrelli et al.

[11] 3,756,690
[45] Sept. 4, 1973

[54] OPTICAL WAVEGUIDE LIGHT MODULATOR

[75] Inventors: Nicholas F. Borrelli; Felix P. Kapron, both of Elmira; Donald B. Keck, Big Flats, all of N.Y.

[73] Assignee: Corning Glass Works, Corning, N.Y.

[22] Filed: Mar. 30, 1972

[21] Appl. No.: 239,748

[52] U.S. Cl. ............................ 350/151, 350/96 WG
[51] Int. Cl. ............................................... G02f 1/22
[58] Field of Search ................ 350/151, 96 R, 96 B, 350/96 WG

[56] References Cited
UNITED STATES PATENTS

| | | | |
|---|---|---|---|
| 3,633,992 | 1/1972 | Uchida et al. | 350/151 |
| 3,320,114 | 5/1967 | Schulz | 350/96 R |
| 3,030,852 | 4/1962 | Courtney-Pratt | 350/151 |
| 3,659,915 | 5/1972 | Maurer et al. | 350/96 WG |
| 3,660,291 | 5/1972 | Strong | 350/151 |
| 3,434,774 | 3/1969 | Miller | 350/96 WG |
| 3,647,406 | 3/1972 | Fisher | 350/96 WG |
| 3,196,739 | 7/1965 | Wenking et al. | 350/151 |
| 3,605,013 | 9/1971 | Yoshikawa et al. | 350/151 |

*Primary Examiner*—David Schonberg
*Assistant Examiner*—Michael J. Tokar
*Attorney*—Richard E. Kurtz et al.

[57] ABSTRACT

Modulation of light in a fused silica optical waveguide is accomplished by a Faraday effect rotation of the plane of polarization of the light propagating in the waveguide. The fused silica waveguide utilized has unique characteristics of low attenuation and low depolarization due to the purity of the fused silica, the manner in which the fused silica is made, the use of the same base material for the core and cladding layer, and a single mode transmission characteristic. The low attenuation and low depolarization permit low strength magnetic fields to cause large rotations of the plane of polarization of the light beam in the waveguide. Because of the length of the light path exposed to the magnetic field, rotations of at least 90° can be accomplished with the application of as little as 100 oersteds of magnetic field along the longitudinal axis of the guide.

19 Claims, 6 Drawing Figures

OPTICAL WAVEGUIDE LIGHT MODULATOR

BACKGROUND OF THE INVENTION

This invention relates to optical modulators and more particularly the modulation of light transmitted through an optical waveguide.

The modulation and gating of light has taken on increasing importance in the communications field because of the density of information that can be transmitted on a single beam. One of the methods of controlling and confining a particular light beam is through what is sometimes referred to as a "light pipe." An optical waveguide is one type of "light pipe" in which only selected modes of transmission are permitted. Although there are various methods of modulating light which is to be transmitted through such an optical waveguide, the majority of these modulation techniques modulate or gate the light prior to its introduction into the waveguide so that the only function of the waveguide is to faithfully transmit the already modulated light from the input of the waveguide to its output. It is however advantageous and more efficient to be able to modulate the light as it travels down the optical waveguide so that the optical waveguide not only serves as a conduit for the light but also serves as a modulator or light gate.

The subject invention utilizes the Faraday effect to modulate the light in the waveguide. The Faraday effect is such that light polarized in a given direction has its polarization direction changed by the application of a magnetic field parallel to a beam of polarized light. This change of polarization direction is called a rotation and is sensed and converted to a change of light beam intensity. The change in intensity of the light beam by the magnetic field is the "modulation" referred to herein.

Up until the present, this effect has been observed only in bulk glass and has been of little practical use because of the small rotations which could be achieved. The efficient modulation or gating of light by the application of a magnetic field according to the Faraday effect has up to now been impossible because of the attenuation both in bulk glass and in prior art "light pipes." With high attenuation there cannot be a long light path subjected to a magnetic field. In prior art devices attenuation is on the order of 1000 db/km. However with the subject waveguide, attenuation is reduced to 20 db/km or less. Thus a substantial path of light can be acted upon by a magnetic field when the subject waveguide is used. It will be appreciated that in bulk glass of the type used in observing the Faraday effect, only about 30 minutes of polarization rotation can be obtained with an applied field of about 100 oersteds for a 1 cm path length. This small rotation in bulk glass is due primarily to attenuation resulting in a comparatively short useable optical path length within the glass. It should be noted that even if prior art optical waveguides were to be used to provide a light path parallel to a magnetic field, attenuation would preclude large Faraday rotations. However, it is now possible with the optical waveguide to be described to maintain a useable transmission of light through several meters parallel to a magnetic field and to obtain rotations in excess of 90° with magnetic fields as small as 100 oersteds.

A second problem with conventional "light pipes" is the destruction of the initial state of polarization of an incoming light beam. This is called "depolarization." In order for the Faraday effect to be operative, the light beam acted on by the magnetic field must be either linearly or elliptically polarized. In either case there is an identifiable direction of the plane of polarization. In linear polarization the direction of the plane of polarization is the direction of the electric field vibration. In the elliptical case the direction is the direction of the major axis of the ellipse. In prior art "light pipes" the initially polarized light beam becomes significantly "depolarized" with distance. In general, the longer the "light pipe" the more depolarization that will occur. Thus even if a low attenuation "light pipe" is used, Faraday rotations will be obscured because of the depolarization.

Depolarization has two causes. The first is scattering and the second is due to multi-mode interaction. With respect to scattering, it has been found that in the waveguide to be described there is little depolarization because of the materials used. Depolarization due to multi-mode interaction can be eliminated by constructing the waveguide to operate in a single mode region. As a result depolarization in the subject waveguide is less than 1 percent over a distance of 1 kilometer. The waveguide also has an exceptionally low attenuation because of the purity of the materials. This polarization preservation quality and low attenuation makes possible an efficient Faraday effect optical modulator.

As mentioned above in addition to scattering as a cause of depolarization there is also a depolarization due to multi-mode interaction. In general, the larger the number of modes of light propagating in the waveguide, the greater will be the depolarization. Normally in a "light pipe" there are a very large number of modes propagating. Each of these modes has its own propagation and distribution characteristics. All of the modes interact with one another to vary the phase of the light in the "light pipe." This causes the above destruction of polarization. However in the subject waveguide, there are only a few selected modes. These modes can operate independently of one another such that the waveguide can be considered a single mode waveguide. When only these modes are present, polarization is preserved throughout the length of the waveguide. In other words, it is a finding of this invention that optical waveguides supporting only either one or a few modes can be produced which transmit light without degrading the polarization states of these modes regardless of the length of the waveguide.

It should be noted that in the prior art "light pipes" where a very large number of modes are propagated, the magnetic field operates on all of these modes, resulting in a masking of the Faraday effect. Because only one or a few modes are transmitted in the subject waveguide, dilution or intermixing of Faraday rotations is not a problem.

In summary, by use of a unique waveguide, significant rotations can be achieved and a practical modulator can be built. As mentioned, the waveguide is characterized by an extremely low attenuation and a low depolarization due to a number of characteristics of the waveguide. The first characteristic of the waveguide is that both the core and the cladding layer are made of fused silica. It is this material which enables large rotations with low level magnetic fields. Fused silica can now be made substantially pure by a flame hydrolysis soot deposition technique. This technique produces a raw material so pure that light scattering is minimal in the finished waveguide. This is important because scattering of any kind results in attenuation and depolarization of a light beam as it travels down any substantial length of waveguide. As mentioned before, the other portion of the depolarization comes from interaction between the very large number of modes of light that can propagate in a light pipe. When fused silica is doped two things occur. First, the index of refraction of the core or the cladding can be readily changed by selective doping. Secondly the Verdet constant of the fused silica can also be readily altered by doping of the fused silica. If the index of refraction of the core of the waveguide is made only slightly larger than that of the cladding, the waveguide operates to transmit only selected modes. By limiting the number of modes that can propagate, the other portion of the depolarization is eliminated. Further if rare earth or lead dopants are used, the Verdet constant of the fused silica can simultaneously be increased. This markedly increases the sensitivity of the waveguide to magnetic fields so that modulation can be achieved with low level magnetic fields. Finally because the cladding layer and the core are made of the same base material, mechanical stability is increased because of thermal and physical matching. It can be seen therefore that low attenuation and low depolarization are made possible by use of fused silica as the waveguide material. These two characteristics permit the use of long waveguides which can maintain a significant optical path length parallel to a magnetic field. This in turn results in rotations exceeding 90° for a 100 oersted field and a path length of 54 meters instead of only 30 minutes using a 100 oersted field and a usable 1 cm path length bulk glass.

SUMMARY OF THE INVENTION

It is therefore an object of this invention to provide an improved optical modulator and an improved method of light modulation.

It is a further object of this invention to provide in combination an optical waveguide having low attenuation and low depolarization and a Faraday type light modulation system so as to modulate or gate the light as it passes through the waveguide.

In accordance with an important aspect of this invention, the modulator consists essentially of an input light beam polarized in a given direction, an optical waveguide of the type described adapted to transmit the polarized light beam, means for developing a modulated magnetic field along the longitudinal axis of the waveguide and an output polarizer.

Selective application of the magnetic field as well as variation of the magnetic field causes a "modulation" of the light beam traveling through the waveguide by rotating its plane of polarization. In this manner, the amplitude or intensity of the light beam can be efficiently modulated or even gated by changing the amount of rotation induced by the external magnetic field. It is the unique optical waveguide having the above characteristics which permits the Faraday polarization rotation to be effective.

Other objects of the invention will be more apparent from the following more detailed description and appended claims in conjunction with the drawings.

DETAILED DESCRIPTION OF THE INVENTION

The subject light modulator involves the combination of a unique optical waveguide and certain means for inducing a Faraday rotation of the plane of polarization of light traveling through the waveguide. The Faraday effect described herein is the rotation of the plane of polarization of a light beam by the action of a magnetic field along the direction of the light beam. The usual expression for the effect is given by the following formula:

$$\theta \text{ (min of arc)} = VH(\text{oersteds}) \times L(\text{cm}) \tag{1}$$

where V is the Verdet constant and H is the field in the direction of the light beam.

If an isotropic optical waveguide fiber is enclosed in a solenoid and coherent polarized light is sent into the guide, the action of the magnetic field will rotate its plane of polarization by an amount given by the above equation where "L" is the length of the fiber enclosed by the solenoid. If the output is incident on a polarizer rotated 90° from the initial polarized light direction then upon application of the field, light will come through to the extent given by the expression $$I/I_o = \sin^2 \theta = \sin^2 (VHL).$$

In the event of a birefringent fiber as for example produced by an elliptical core, the device can be operated in the above mode by inputting the polarized light beam along the "fast" or "slow" axis of the waveguide or by the insertion of a compensating phase plate. The purpose of the phase plate is to remove a DC component of the light output of the waveguide which is introduced by elliptical polarization. It will be appreciated that elliptical polarization can occur due to birefringence in the waveguide. However, for either case the arrangement shown in FIG. 1 will efficiently cause a light modulation.

*a*. The Modulator

Figure 1:
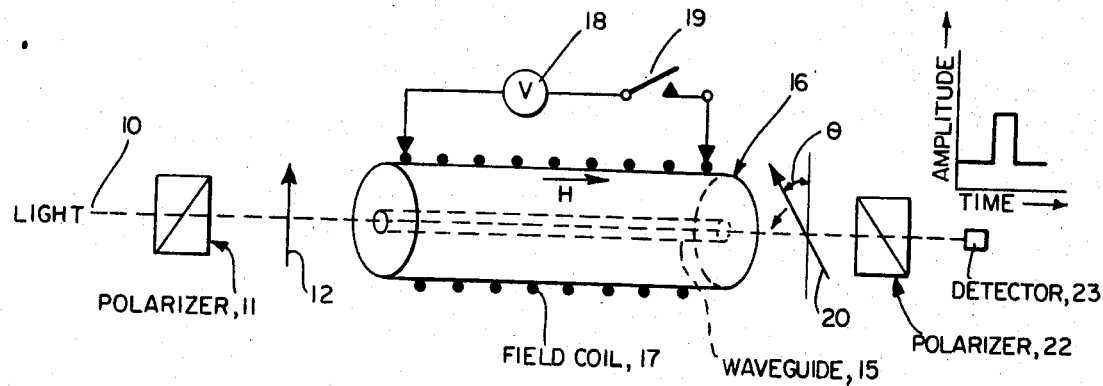
FIG. 1 is a schematic diagram of the subject light modulation system showing an incoming polarized light beam passing through an optical waveguide and thence through a further polarizer to a detector with means for selectively providing a magnetic field in longitudinal direction about the waveguide.

In FIG. 1, coherent light beam 10 is made incident on a first polarizer 11 which polarizes the light in a direction indicated by the arrow 12. In one embodiment a coherent light source is used which is a helium-neon laser. Alternately, a non-coherent light source can be used. Although there will be certain coupling problems with a non-coherent light source, it can be used with reduced efficiency. The polarized light is then made incident on the end or input face of a waveguide 15 which is positioned within a solenoid 16 having a field coil 17 maintained in position about the waveguide 15. The field coil 17 is energized by a voltage source 18 and a switch 19 so as to produce a magnetic field, H, in a given direction. The result of the application of the magnetic field, H, is the rotation of the plane of polarization of the light in the waveguide, shown by the arrow 20 to be the angle $\theta$ where $\theta$ = VHL as given hereinbefore. The light beam is then passed through a second polarizer 22 whose plane of polarization is rotated 90° from that of polarizer 11. Unless the original plane of polarization is rotated no light is transmitted through polarizer 22 to a detector 23. However, when the magnetic field is applied across the waveguide 15 a certain component of the light traveling through the polarizer 22 will not be cancelled and the detector 23 will register some value. This value can be computed from the expression $I/I_o = \sin^2 \theta = \sin^2 (VHL)$. In one operative embodiment of the invention with a fused silica waveguide the Verdet constant V is 0.01 min/oersted-cm. With a field of 100 oersteds and a waveguide length of 27 meters, 100 percent modulation is obtained with the output polarizer making an angle of 45° with the input polarizer.

In another configuration the detector 23 is not used and the modulator serves as the Q switching element for a laser. In this embodiment either no light is transmitted or there is a full transmission of light. This gating effect is due to the ability to rotate the plane of polarization by 90° with small magnetic fields. For purposes of this invention the word "modulation" is taken to include "gating" as just described. It will be appreciated that the selective application of the voltage 18 through the solenoid coil produces a modulation which can be in pulse form as shown by the graph to the right of the detector 23. The replacing of the switch 19 by any type of modulation system will produce analogous rotations of the light within the waveguide 15 and therefore analogous amplitude variations of the light beam at the detector 23.

Figure 2:
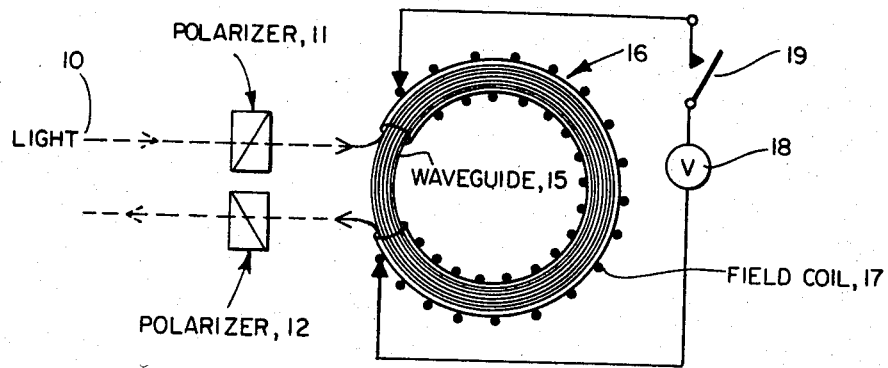
FIG. 2 shows an alternate embodiment of the light modulator in which the waveguide is folded into a toroidal configuration so as to present an increased length of waveguide to a magnetic field produced by a field coil surrounding the waveguide.
Figure 3:
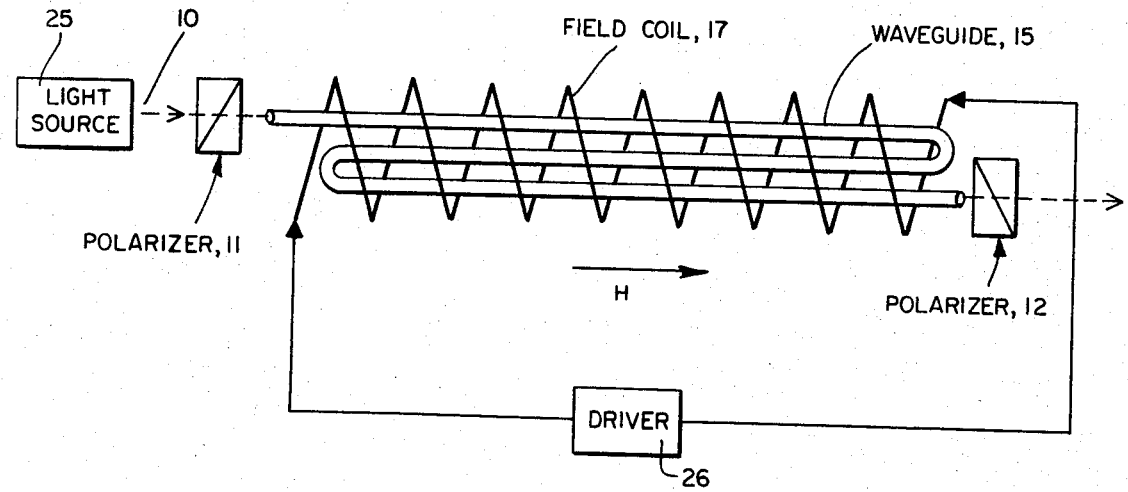
FIG. 3 is a schematic diagram indicating another method of folding the optical waveguide so as to present an increased length of waveguide to a magnetic field induced by the field coil shown.

It will be appreciated that the longer the waveguide in the magnetic field, the greater the rotation due to the magnetic field. Long light paths can be easily achieved by sending the fiber back and forth through the solenoid. This is called "folding" the light path and is possible insofar as the sense of the Faraday rotation is independent of light direction. With such a folding of the light path significant rotations can be obtained with relatively low magnetic field strengths. The folded configurations are shown in FIGS. 2 and 3 in which like elements are labeled with like reference characters. From FIG. 2 it can be seen that the most practical device would involve a toroidal configuration with the waveguide 15 encircled by a solenoid of many turns.

A linearly folded waveguide as shown in FIG. 3 includes a coherent light source 25. A driver 26 takes the place of elements 18 and 19. The driver may be any type of voltage source which can be modulated including an AC source upon which is impressed a certain DC level. In this case it is important to note that the sense of the Faraday rotation is in fact independent of the propagation direction such that linear folding does not result in a cancellation of the magnetically induced rotation.

In the event that linearity of amplitude is required between the output light and the impressed signal, a bias may be applied either by a constant background H field, or where possible by rotation of the output polarizer off the null position. If the output polarizer is shifted off null by an amount $\theta_A$ then the output is given by the expression $I/I_o = \sin^2 (VHL - \theta_A)$.

It will be appreciated that a single mode waveguide can be made to have a core and a cladding member. In this invention, the core and the cladding members are made of very similar materials such that the index of refraction of the core is not much greater than the index of refraction of the cladding. This permits a single mode or a limited number of modes of light to be transmitted. Several embodiments of the subject "single-mode" waveguide are possible. In one embodiment of the invention a cladding member of pure fused silica is combined with a core composed of fused silica containing a suitable amount of one or more doping materials. The dopant is incorporated in the material of the core in an amount calculated to provide an increase in the refractive index required for particular waveguide applications. Reference to a dopant is intended to include both individual additives and combinations or mixtures.

In a second embodiment, a cladding member and core are both doped fused silicas and a dopant is the same in each material. In this embodiment, the core is necessarily more heavily doped; that is, provided with a suitably larger amount of dopant in the core and cladding member is calculated to provide the refractive index differential required for waveguide purposes.

Finally, the cladding member and the core may both be composed of doped fused silicas wherein different dopant or combinations thereof are used in the two parts. In this situation, the amount or portion of dopant in the core may or may not be made greater than that in the cladding. Thus, the dopant in the cladding may have a relatively small effect on refractive index in the glass as compared with the dopant in the core. In that event, the actual weight of dopant in the cladding may be that in the core. The significant factor is the actual refractive index differential, and this must be positive in the direction of the core. Thus, a given amount of dopant must provide more of an increase in the refractive index of the core than in the cladding member, regardless of their respective amounts.

In the absence of other factors, the first embodiment is the most convenient to produce and hence preferred. However, where close matches of physical properties such as annealing temperature or expansion coefficient are important, and where other secondary factors become important, the second or third embodiment may prove desirable.

It will be appreciated, however, that any low loss and/or polarization preserving optical waveguide is included as part of this invention whether or not it is made of fused silica.

b. The Waveguide

This invention utilizes a completely new and novel type of material for the production of optical waveguides and recognizes particular properties of this novel waveguide which make it uniquely useful in modulating or gating previously polarized light traveling through the waveguide. Heretofore, less refractory and easily workable materials have been used in the production of optical waveguides. It has now been discovered that substantially pure fused silica which is extremely hard and difficult to work, can be used to produce an optical waveguide in which light can be readily modulated. The term "pure fused silica" is used herein to indicate a fused silica containing no elemental impurities in an amount greater than 0.1 percent by weight except for hydrogen which may be present in amounts up to 5 percent by weight. As mentioned hereinbefore, it was found that not only can such a fused silica optical waveguide be provided which selectively transmits only a single or a few modes of light, but also the polarization state of any light passing therethrough is preserved through the waveguide. This permits an extremely efficient Faraday rotation to be imparted to light traveling within the waveguide.

The selective transmission of certain modes in an optical waveguide is made possible by appropriate indices of refraction of the core and cladding layer. The condition under which propagation of a particular mode will no longer be localized about the core of an optical fiber can be expressed in terms of a cut-off value U. An exceptionally complex equation, and an explanation thereof, from which the value U for a particular mode can be determined may be found on page 55 of Fiber Optics - Principles and Applications, by N. S. Kapany. On the same page of this book Kapany expresses a "fiber characteristic term" — "R" — in terms of the optical fiber variable by the equation $$R = (2\pi a/\lambda)(n_1^2 - n_2^2)^{1/2}$$

(2)

where
  $a$ = core radius of the waveguide
  $\lambda$ = wavelength of light to be transmitted
  $n_1$ = core index of refraction
  $n_2$ = cladding index of refraction
which can be rewritten as $$R = (2\pi a/\lambda)(n_1+n_2)(n_1-n_2)^{1/2}$$

(3)

Then as is explained in Kapany, for a particular mode to propagate within an optical fiber having a particular "fiber characteristic term" — "R," "R" must be greater than or equal to the cutoff value U for the mode.

For instance the mode $HE_{11}$, the definition and physical characteristics of which can be found in the aforementioned cited sources, is the only mode of light that will propagate along a fiber which has an R value of less than 2.405. Therefore, if R is set equal to 2.405 and equation (3) is evaluated, it can be seen that a method of limiting light propagation of a desired wavelength to one mode is to coordinate the parameters $a$, $n_1$ and $n_2$ of the waveguide. That is, if the difference between the two indices of refraction ($n_1-n_2$) increases, the core radius $a$ must decrease; and if ($n_1-n_2$) decreases, the core radius $a$ must increase.

It is however difficult to produce a waveguide having core and cladding indices of refraction within limits necessary to maintain single mode propagation when the waveguide has a very small core. The difficulty increases markedly in producing waveguides with larger cores. For example, an optical waveguide having a small core diameter of approximately one micron requires a difference in the two indices of refraction on the order of $10^{-2}$. However, if the optical waveguide has a large core diameter of approximately one millimeter, a minute differential between the two indices of refraction of approximately $10^{-8}$ is required. This large core is made possible by a flame hydrolysis method to be described hereinafter.

By analogy waveguides having a "limited" number of modes propagating can also be produced by suitable doping. An example of one set of parameters for a waveguide capable of propagating only the first seven modes is shown in the following table:

TABLE I

| | |
|---|---|
| Cladding Composition: | 100% $SiO_2$ |
| Core Composition: | 5.25 wt.% $TiO_2$ - 94.75 wt.% $SiO_2$ |
| Light Wavelength: | $\lambda$ = 5893 A |
| Core Diameter: | $d$ = ~6$\mu$m |

The difficulty of very accurately controlling the diameter of the core, while maintaining a small, but precise differential between the index of refraction of the core and the index of refraction of the cladding layer, has, in the past, made the production of optical waveguides a very slow and expensive process. However by using fused silica for both the core and the cladding, and by appropriate dopings, single mode waveguides can be easily fabricated. The fused silica waveguide is the subject of copending applications entitled "Method of Producing Optical Waveguide Fibers" by Donald B. Keck and Peter C. Schultz, Ser. No. 36,267, filed May 11, 1970 (Keck-Schultz, 1-2) and "Glass Optical Waveguide" by Robert D. Maurer and Peter C. Schultz, Ser. No. 36,109, filed May 11, 1970 (Maurer-5).

Fused silica is particularly suitable for production of waveguides in accordance with the requirements set forth above because fused silica is readily attainable with exceptionally high purity, and because such pure forms have a very precise reproducable index of refraction. By adding a precise percentage by weight of a doping material to the fused silica a "doped fused silica" with an index of refraction that is higher than that of pure fused silica by a precise reproducable amount is readily produced.

Because the amount of doping material necessary to give the desired increase in the index of refraction of fused silica is small, the physical characteristics, such as viscosity, softening point and coefficient of expansion of the fused silica in the core can be made almost identical to those of the fused silica used for the cladding member. This substantially eliminates some of the difficulties encountered in drawing waveguides, such as excess internal strain, and large viscosity differential. Accordingly, it is generally desirable that the doping material not exceed 15% by weight of the glass.

In addition, pure fused silica has excellent light transmission qualities since both absorption of light energy and intrinsic scattering of light are exceptionally low in such material. It is essentially free of the transition metal oxides and other light absorbing or glass coloring materials. Scattering of light caused by the presence of particulate impurities rather than the intrinsic nature of the material itself is low. It will be understood, of course, that the dopants added to fused silica in accordance with the present invention neither absorb nor scatter light energy to any appreciable extent in the wavelength of interest. Further, fused silica is a material such that an optical waveguide once formed possesses the quality of being highly resistant to damage from high temperatures, corrosive atmosphere, and other severe environments.

Basically, the preferred waveguide consists of a fused silica cladding and a fused silica core doped to give the waveguide a single mode or limited mode characteristic. The purity of the fused silica as well as its doping comes from a flame hydrolysis soot deposition followed by a drawing procedure as outlined below.

c. Methods of Making the Waveguide

After fused silica blanks or tubes are made available from the flame hydrolysis method referred to in the aforementioned copending application of Keck and Schultz, and described hereinafter, the waveguide possessing a pure fused silica cladding and a doped fused silica core may be produced by any suitable method including but not limited to : (a) insertion of a rod of fused silica, doped as required to increase the index of refraction to the desired level above that of pure fused silica, into a tube of pure fused silica; raising the temperature of the rod and tube combination until the combination has a low enough viscosity for drawing; and then drawing the rod and tube until the tube collapses around and fuses to the rod, such that the corresponding cross-sectional area of combination is decreased to the desired dimension; or (b) the method comprising first forming a film of pre-doped silica on the inside wall of the tube of pure fused silica; and then drawing this composite structure to produce a cross-sectional area resulting from the collapse of the film of doped fused silica to form a fiber having a solid cross-section of the desired diameter.

There are many dopant materials which can be added to fused silica in minute quantities to increase its index of refraction to a predetermined level. In order to raise the Verdet constants, rare earth dopants are preferred. However, a primary factor to consider is the diffusion property of the dopant material.

When producing one type of optical waveguide, dopant diffusion is a necessity. Here, the core is drawn with a small diameter and subsequent diffusion increases the core diameter to the desired size. Doping materials containing alkali ions are readily diffused into the fused silica cladding of an optical waveguide and increase the effective core diameter.

Most waveguides, however, require a dopant that does not diffuse within the cladding to any appreciable extent. Specifically, the dopant must not diffuse out of the core and into the cladding member either during production or during subsequent service. Such diffusion would effectively increase the diameter of the core and thereby alter the mode selection abilities of the waveguide. Suitable dopants having minimum diffusion properties include the multivalent metal oxides: titanium oxide, tantalum oxide, tin oxide, lead oxide, niobium oxide, zirconium oxide, and aluminum oxide and the rare earth oxides: ytterbium oxide, lanthanum oxide, terbium oxide, dysprosium oxide and praseodymium oxide.

The addition of these oxides, individually or in combination to a fused silica glass raises the refractive index of such a glass in a predictable manner. In general, a linear relationship exists between the amount of oxide added and both the absolute refractive index and differential or increase. Again those dopants raising the Verdet constant of the fused silica are the rare earth oxides and lead oxides.

It may be noted that when the weight percent of the oxide is plotted against the refractive index there is a break in both the $TiO_2$ and the $Ta_2O_5$ curves. This is believed to be associated with structural changes in the glass. In any event a desired refractive index differential or increase can be calculated in terms of weight percent addition for any desired oxide.

Figure 4:
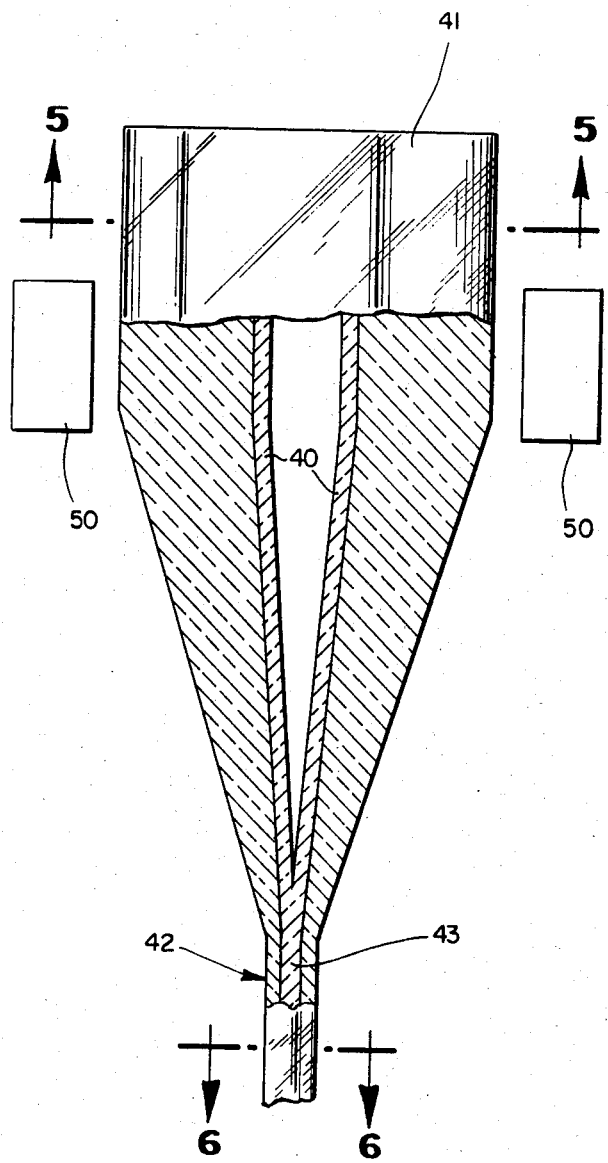
FIG. 4 is a representation in cut-away of one method of forming the subject single-mode waveguide indicating a drawing technique.
Figure 5:
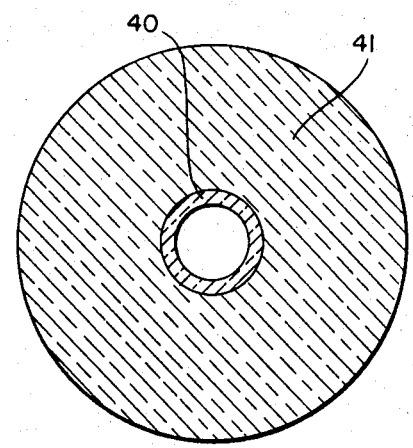
FIG. 5 is a cross-section of the structure shown in FIG. 4 taken along the 5—5 axis.
Figure 6:
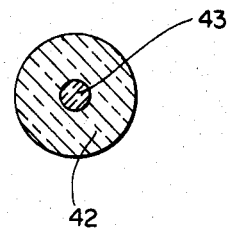
FIG. 6 is a cross-section of the structure shown in FIG. 4 taken along the 6—6 axis indicating the completed waveguide structure cross-section.

As shown in FIGS. 4–6, production method (b), as described more fully in the Keck-Schultz application, involves applying a doped silica film, 40, on the inside wall of a fused silica tube 41, then heating the tube by suitable means 50 to vitrify the doped silica film and soften the filmed tube for drawing into a solid fiber 42 with the film forming a central core 43. In carrying out this method, the fused silica to be used as the core member is produced in the following manner. A suitably proportioned mixture of vapors of hydrolyzable compounds of silicon and a dopant element are passed through a burner to produce a corresponding oxide soot by flame hydrolysis. This soot is forced into the cladding layer tube and deposited on the inside surface thereof. When a film of adequate thickness is deposited, the soot generation is stopped and the filmed tube is heated to vitrify the film, soften the tube, and collapse the composite into rod form. The softened rod may then be drawn down to desired size.

It has been found that light transmission qualities may be improved in doped fused silica formed into optical waveguides, if the waveguides are drawn in an oxygen atmosphere and then "heat treated" in an oxygen atmosphere. The "heat treatment" referred to consists of heating the waveguide in an oxygen atmosphere to between 500°C and 1000°C, for not less than thirty minutes; the length of treatment being related to the treatment temperature. Lower temperatures require longer treatment periods, while treatment at the higher temperature allows shorter time periods.

A specific example of a waveguide produced by the practice of this invention follows. A 1 ½ to 2 micron film of fused silica doped with titanium was bonded to the inside wall of a ¾ inch outside diameter, ¼ inch inside diameter, substantially pure fused silica tube. Prior to the drawing process, a nominal 3.00 percent of dopant material is added. As this diffuses into the cladding, the effective concentration of dopant is reduced. The deposited doped fused silica essentially consisted of 97 percent fused silica and a nominal 3 percent titanium dioxide. The composite structure was then heated in substantially an oxygen atmosphere until it reached a temperature at which the materials had low enough viscosity for drawing (approximately 1900°C). The composite structure was then drawn to reduce the diameter thereof until the film of titanium doped fused silica collapsed to seal the longitudinal hole and form a solid core surrounded by pure fused silica. The resulting composite rod was then further drawn to reduce the diameter thereof to a final diameter of approximately 100 microns. The core of the optical waveguide was measured at approximately 3 microns in diameter. The core index of refraction was approximately 1.466 while the cladding had an index of refraction of approximately 1.4584. After the fiber was drawn, it was heat treated at 800°C in an oxygen atmosphere for approximately three hours.

In carrying out production method (a) mentioned earlier, a glass tube and a glass rod are first formed separately and then combined into a composite article. For this method of production, the glasses of the invention may be produced by normal glass melting procedure; that is, by mixing a suitably proportioned batch of silica and the dopant oxide, and fusing the batch mixture. Alternatively, a soot technique, as described in U.S. Pat. No. 2,326,059, granted Aug. 3, 1943 to Dr. H. E. Nordberg, or a gelation technique, followed by fusion, may be employed.

d. The Preferred Process for Making Fused Silica — Flame Hydrolysis

However, the glasses of the invention tend to be highly refractory glasses. Therefore, it is difficult to attain a sufficiently homogenous material by the above batch processing techniques to insure an adequate degree of optical quality for waveguides. Accordingly, to provide for the exceptionally high purity, the flame hydrolysis technique described in detail in the Nordberg patent mentioned above may be employed.

In this procedure, a suitably proportioned mixture of vapors of hydrolyzable compounds of silicon and the dopant element is entrained in a dry carrier gas such as oxygen. The vapor mixture is passed through a burner to hydrolyze the vapors and convert them to the corresponding oxides by flame hydrolysis. The oxides thus formed melt in the flame and are deposited in vitreous form on a suitable mandrel or bait. In this manner, a substantial deposit of fused silica is built up in a form commonly known as a boule.

The boule may be removed from the deposition furnace and rapidly cooled to room temperature for inspection purposes if desired. Alternatively, it may be transferred to a furnace at or slightly above the fused silica annealing temperature and then cooled at a suitable rate to provide an annealed body. Finally, the boule may be cut to desired shapes and reworked and/or redrawn as described earlier.

In carrying out this modified flame hydrolysis method, any hydrolyzable compound of silicon and of the desired dopant may be used. In the event the compounds are compatible in mixture and have suitable vapor pressures, a liquid mixture may be used. Otherwise, the compounds may be vaporized separately and the vapors combined in suitable proportion. If necessary, the delivery system is kept properly heated to avoid condensation.

It is generally preferrable to use the metal chlorides as the hydrolyzable compounds. These are the least expensive and most readily available. Also they are convenient to use and produce by-products that are easier to control. However, from a technical standpoint, any other vaporizable and hydrolyzable compound may be substituted. These include particularly the other halides and organo-metal compounds.

The vapors may be entrained by any carrier gas that does not react with the vapor during entrainment. This includes inert gases such as nitrogen, and combustible gases such as oxygen and natural gas. It is desirable to use an oxygas burner for the flame hydrolysis step, and then employ either oxygen or natural gas as the carrier gas. The carrier gas must, of course, be dry to avoid premature hydrolysis of the vapors and consequent clogging of the delivery system.

e. The Preferred Waveguide

The preferred waveguide has both core and cladding made of fused silica or doped fused silica. The purity of the fused silica is obtained through a flame hydrolysis method. Doping is achieved by adding rare earth or lead dopants at the time the fused silica is formed. These dopants raise the Verdet constant of the waveguide. The dopant concentration in the core and cladding are such that a single mode transmission characteristic is achieved. When such a waveguide is used in the system described, magnetic fields on the order of 100 oersteds provide rotation greater than 90° for waveguides having lengths of 54 meters.

What is claimed is:

1. An optical modulator for modulating a beam of light initially polarized in a predetermined direction comprising in combination, an optical waveguide, composed of a core member and a cladding member surrounding said core, the index of refraction of said core member being greater than the index of refraction of said cladding member by an amount such that a limited number of modes of said light are transmitted by said waveguide, said waveguide being of a purity and of a configuration so as to transmit without substantial loss over a substantial length thereof the limited number of modes of light, said waveguide being such that the polarization of any light beam in said waveguide remains substantially preserved during transmission from an input face to an output face of said waveguide, and means for generating a modulated magnetic field along the longitudinal axis of said waveguide such that the initial plane of polarization of any beam of light in said waveguide is rotated about said longitudinal axis by an amount proportional to the strength of said magnetic field, whereby the rotation of the direction of polarization of the light in said beam by said magnetic field constitutes modulation of said light beam.

2. The optical modulator as recited in claim 1 and further including in combination therewith;

means for polarizing light, said means being adjacent to said output face and oriented to pass only light from said output face having a polarization direction at an angle different from said initial predetermined direction, whereby light emanating from said output face passing through said means for polarizing is modulated in amplitude in accordance with modulation of said magnetic field.

3. The optical modulator as recited in claim 1 wherein said waveguide is folded with the folded sections having longitudinal axes parallel to said magnetic field.

4. The optical waveguide as recited in claim 3 wherein said waveguide is toroidal in form.

5. The optical modulator as recited in claim 1 wherein said core member and said cladding member are basically made of fused silica doped so that the index of refraction of said core member is greater than said cladding member.

6. The optical modulator as recited in claim 5 wherein said fused silica members are prepared in a flame hydrolysis process to obtain substantially pure fused silica, whereby said waveguide achieves exceptionally low attenuation and exceptionally low depolarization.

7. The optical modulator as recited in claim 5 wherein one of said members is fused silica doped with at least one or more oxides selected from the group consisting of titanium oxide, tantalum oxide, tin oxide, niobium oxide, zirconium oxide, aluminum oxide, lead oxide, and the rare earth oxides.

8. The optical modulator as recited in claim 5 wherein one of said members is fused silica doped with at least one material selected from the group consisting of lead and the rare earth elements, whereby the Verdet constant of said waveguide is increased thereby increasing the efficiency of said modulator.

9. The optical modulator as recited in claim 5 wherein said cladding member is fused silica doped with at least one multivalent metal oxide selected from the group consisting of titanium oxide, tantalum oxide, tin oxide, niobium oxide, zirconium oxide, aluminum oxide, lead oxide, and the rare earth oxides.

10. The optical modulator as recited in claim 5 wherein said cladding member is undoped fused silica and the core is fused silica containing a dopant which provides a precise positive differential between the refractive index of said core member and that of the cladding member.

11. The optical modulator as recited in claim 10 wherein said core member consists of fused silica doped with oxides selected from the group consisting of lead oxides and the rare earth oxides whereby the Verdet constant of said waveguide is increased.

12. The optical modulator as recited in claim 11 wherein said core member is formed of 97 percent by weight of fused silica and a nominal 3 percent titanium dioxide.

13. The optical modulator as recited in claim 10 wherein said core member is formed of at least 85 percent by weight of fused silica and an effective amount up to 15 percent by weight of doping material.

14. The optical modulator as recited in claim 5 wherein said cladding layer and said core member are both composed of fused silica containing the same dopant, the proportion of the dopant in the fused silica of said core member exceeding that in the fused silica of said cladding member by a determined amount to provide a precise positive differential between the refractive index of said core member and that of said cladding member.

15. The optical modulator as recited in claim 5 wherein both said cladding member and said core member consist of fused silica doped with titanium oxide.

16. The optical modulator as recited in claim 5 wherein said cladding member and said core member are both composed of fused silica containing a dopant, the dopant in the core being different from that in the cladding member and being present in an amount sufficient to provide a precise positive differential between the refractive index of the core and that of the cladding.

17. An optical modulator for modulating a coherent beam of light initially polarized in a predetermined direction comprising in combination,
an optical waveguide made of fused silica having a purity which transmits without substantial loss over a substantial length of said waveguide a limited number of modes of light, and
means for generating a modulated magnetic field along the longitudinal axis of said waveguide such that the initial plane of polarization of any polarized beam of light introduced into said waveguide is rotated about said longitudinal axis by an amount proportional to the length of said magnetic field such that the direction of polarization of the light in said beam is modified in accordance with the modulation of said magnetic field as said light travels down said optical waveguide.

18. The optical modulator as recited in claim 17 wherein said fused silica is made by flame hydrolysis, which produces a high purity waveguide material, said high purity waveguide material reducing attenuation and depolarization to such an extent that polarization rotations in said waveguide are possible with magnetic fields as low as 100 oersteds.

19. The optical waveguide as recited in claim 18 wherein said waveguide includes a core member and a cladding member of fused silica, one of said members being doped so as to limit the number of modes said waveguide will transmit whereby depolarization of said light beam is limited.

* * * * *